United States Patent
Trout

[19]

[11] Patent Number: 6,111,119
[45] Date of Patent: Aug. 29, 2000

[54] PROCESS FOR REMOVING OIL FROM FOOD PRODUCTS

[75] Inventor: Richard B. Trout, Media, Pa.

[73] Assignee: CocoTech, Inc., Swedesboro, N.J.

[21] Appl. No.: 09/233,730

[22] Filed: Jan. 14, 1999

[51] Int. Cl.$^7$ ................................................. C07C 1/00
[52] U.S. Cl. .................... 554/16; 584/8; 584/12
[58] Field of Search ...................... 584/8, 12, 16

[56] References Cited

U.S. PATENT DOCUMENTS

| | | |
|---|---|---|
| 1,802,533 | 4/1931 | Reid . |
| 2,254,245 | 8/1941 | Rosenthal . |
| 2,680,754 | 10/1954 | Stapleberg . |
| 3,492,326 | 1/1970 | Barnett et al. . |
| 3,939,281 | 2/1976 | Schwengers . |
| 3,966,982 | 6/1976 | Becker et al. . |
| 4,008,210 | 2/1977 | Steele et al. . |
| 4,548,755 | 10/1985 | Stahl et al. . |
| 4,554,163 | 11/1985 | Weber . |
| 4,675,133 | 6/1987 | Eggers et al. . |
| 4,808,426 | 2/1989 | Strop et al. . |
| 5,041,245 | 8/1991 | Benado . |
| 5,281,732 | 1/1994 | Franke . |
| 5,405,633 | 4/1995 | Heidlas et al. . |
| 5,445,841 | 8/1995 | Arendt et al. . |
| 5,525,746 | 6/1996 | Franke . |
| 5,620,728 | 4/1997 | Langley et al. . |
| 5,626,756 | 5/1997 | Heidlas et al. . |
| 5,707,673 | 1/1998 | Prevost et al. . |

*Primary Examiner*—Deborah D. Carr
*Attorney, Agent, or Firm*—Ratner & Prestia

[57] ABSTRACT

A process for recovering oil from oil-bearing food products includes storing the organic solvent vapor used as the extracting medium in a vapor recovery tank between extraction phases. After a liquid organic solvent, such as propane, is used to extract oil from the oil-bearing food products, the solvent is vaporized, and at least some of the solvent remaining on the defatted food solids is recovered, for example by opening a valve leading to a vapor recovery tank which has a pressure lower than the pressure of the extraction vessel. More preferably, at least one vacuum tank can be used to increase the percentage of organic solvent vapor delivered to the tank or vessel to which the vapor is being introduced. Preferably, several solvent or miscella tanks, for storing substantially pure solvent and solvent of varying oil concentration, are used during an extraction phases. By using several such tanks, solvent of decreasing oil concentration can be sequentially used as the extracting medium during a single extraction phase. Even more preferably, two or more extraction tanks are used sequentially such that while one tank is undergoing an extraction phase, the defatted food solids of another tank are being replaced with fresh, oil-bearing food solids. With or without this configuration, the miscella containing the highest concentration of oil can be continuously conveyed to a distillation unit at which this miscella is separated into substantially pure liquid organic solvent and oil product. Typical applications include removing and separating the oil from food products, such as removing cocoa butter from cocoa powder.

17 Claims, 4 Drawing Sheets

PROCESS FOR REMOVING OIL FROM FOOD PRODUCTS

FIELD OF THE INVENTION

The present invention relates to extracting oil from oil-bearing food products using a normally gaseous organic solvent and recovering the oil.

BACKGROUND OF THE INVENTION

Many food products contain varying amounts of oil, i.e., liquid triglycerides, which can be extracted as a valuable commodity. Such food products include cocoa and other plant materials, such as oil seeds, cereal brans, fruits, beans, and nuts. There are numerous important commercial uses of the oils derived from such plant materials, such as in cooking, cosmetics, pharmaceuticals (as carriers), lubricants, and other applications. Depending on the food product, the defatted food product might also have some commercial or industrial use. Accordingly, numerous processes aimed at extracting and separating such oils have been proposed.

Organic solvents are frequently used as the medium for extracting oil from such food products. In a conventional extraction process, the oil-bearing food product is treated with a suitable solvent, usually a lower carbon alkane, such as hexane, to extract the oil from the oil-bearing food product. The resulting solvent/oil mixture, called a "miscella," is then separated in a distillation unit to separate the oil product from the solvent, which is recycled.

U.S. Pat. No. 2,680,754 to Stapelberg is directed to the extraction of oils and fats from solids which are placed in an extractor. A number of tanks store miscella of increasing purity from a previous batch process. To start the operation, miscella from the tank which contains the least pure miscella (i.e., the highest oil content) is introduced to the extractor. During the extraction process, miscella of increasing purity is sequentially delivered to the extractor until substantially pure solvent is used. Between batch extraction processes, the defatted solids are conveyed to a bin, and the solvent remaining in the defatted solids is recovered, subsequently purified, then condensed and returned as fresh solvent to the fresh solvent tank.

While prior art extraction methods have met with various degrees of commercial success, there still remains a need for an improved solvent extraction method which is more energy and cost efficient, which can effectively and easily remove the solvent from the defatted solids, and which efficiently recycles the solvent.

SUMMARY OF THE INVENTION

In view of its purposes, a first embodiment of the present invention provides a process for removing oil from food products which involves first charging an extraction vessel with oil-bearing food solids then drawing a vacuum on the extraction vessel to remove substantially all oxygen from the extraction vessel. Following an optional nitrogen purge to remove the last of the oxygen, a portion of the oil is extracted from the food solids by passing a liquid organic solvent through the extraction vessel during a first extraction phase. After withdrawing substantially all of the liquid organic solvent from the extraction vessel and vaporizing the remaining portion of the liquid organic solvent, the pressure of the extraction vessel and the pressure of a vapor recovery tank are allowed to reach equilibrium. In this way, a portion of the organic solvent vapor is introduced from the extraction vessel to the vapor recovery tank. After isolating the extraction vessel from the vapor recovery tank, the defatted food solids are removed from the extraction vessel, which is charged with another quantity of oil-bearing food solids. The pressure of the extraction vessel is reduced to a pressure less than the pressure of the vapor recovery tank, and fluid communication between the vapor recovery tank and the extraction vessel is established again for a time sufficient to reach equilibrium. In this way, a percentage of the portion of organic solvent vapor returns from the vapor recovery tank to the extraction vessel for a second extraction phase subsequent to the first extraction phase.

According to a preferred embodiment of the present invention, the steps of the process of the first embodiment are done, but, in addition, at least one vacuum pump, disposed between the vapor recovery tank and the extraction vessel, is selectively actuated to provide a higher pressure in the tank or vessel to which the organic solvent vapor is introduced. In this embodiment, a first vacuum pump is provided in a first conduit with a feed end proximate to the extraction vessel and a discharge end proximate to the vapor recovery tank. This first pump is actuated to allow a relatively higher portion of the organic solvent vapor to be introduced from the extraction vessel to the vapor recovery tank. In addition, a second vacuum pump may be provided in a second conduit with a feed end proximate to the vapor recovery tank and a discharge end proximate to the extraction vessel. This second pump is actuated to allow a relatively higher percentage of the portion of the organic solvent vapor to return from the vapor recovery tank to the extraction vessel for a second extraction phase subsequent to the first extraction phase.

According to another preferred embodiment of the invention, a plurality of solvent or miscella tanks, for storing substantially pure solvent and solvent of varying oil concentration, are used during the extraction phases. According to this embodiment, solvent of decreasing oil concentration is sequentially used as the extracting medium during a single extraction phase.

According to yet another preferred embodiment of the present invention, a plurality of extraction tanks are used sequentially such that while one tank is undergoing an extraction phase, the defatted food solids of another tank are being replaced with fresh, oil-bearing food solids. During extraction phases and up to continuously, the miscella containing the highest concentration of oil is conveyed to a distillation unit at which this miscella is separated into substantially pure liquid organic solvent and oil product. The substantially pure liquid organic solvent is recycled to a solvent feed tank, while the oil product is recovered.

It is to be understood that both the foregoing general description and the following detailed description are exemplary, but not restrictive, of the invention.

BRIEF DESCRIPTION OF THE DRAWING

The invention is best understood from the following detailed description when read in connection with the accompanying drawing, in which.

DETAILED DESCRIPTION OF THE INVENTION

The process of the present invention may be used to remove oil from a wide range of oil-bearing food solids. In principal, all natural products containing fats, oils, or waxes derived from plants, animals, or marine life, can be treated by the process of the present invention. Non-limiting examples of matter to be treated include soybeans, cottonseed, linseed, and cereals such as rice bran, wheat bran, and cornmeal.

The present invention is particularly applicable to the removal of cocoa butter from cocoa powder. The refinement of raw cocoa includes roasting the cocoa beans at about 300° F. for about 30 to 90 minutes to develop the flavor of the cocoa and to drive off some moisture inherent in the cocoa bean. Also, the thin shells of the beans are removed from the nib. Typically, the beans are first roasted then deshelled, although this order is reversed in some processes. After roasting and deshelling, the cocoa is ground and forms a flowable mass because of its high fat content, about 50% by weight. This form of cocoa is commonly known as baking chocolate, which solidifies at around 94° F. If further refinement is desired, this form of cocoa is defatted to about 10–12% fat by using hyrdraulic press plates and squeezing some of the fat out of the cocoa, which forms a solid, hard cocoa press cake. The present invention is particularly well-suited to further defat cocoa press cake down to about 1% fat, but also can remove fat from any form of cocoa during the refinement process described above, even unroasted cocoa, with or without shell pieces. A use of a defatted cocoa/shell mixture is as fertilizer.

As used herein, the term "oil" will refer to both oil in its liquid form and oil in its solid form (i.e., fat or fatty acids). Non-limiting examples of oils which can be removed from the food solids include cocoa butter, olive oil, palm oil, bamboo fat, coconut fat, coffee oils, peanut butter, rape oil (rape-seed oil), sunflower oil, wheat germ oil, rice germ oil, cottonseed oil, maize germ oil, soybean oil, palm kernel oil, and pumpkin seed oil. Oils from beef, veal, and marine animals such as fish can also be separated according to the present invention.

Suitable solvents for use in the present invention are any solvent which is normally a liquid at extraction conditions, and in which the substance to be extracted is soluble under the extraction conditions. The selection of the appropriate solvent (or combinations of solvents) can thus be made based on its (their) known solubility characteristics. If it is necessary to selectively remove certain substances, then the solubility of those substances must be considered in the selection of the solvent (or combination of solvents), as well as the operating conditions used in the process.

Depending on the particular type of substances being removed, solvents suitable for use in the present invention would include low molecular weight alkanes, for example propane, butane, pentane, or hexane. Preferred solvents are those which are normally gases at the typical atmospheric conditions, i.e., room temperature (e.g., 70° F.) and atmospheric pressure. Most preferable for the removal of cocoa butter from cocoa powder is propane.

In the description of the embodiments shown in the drawing, much of the materials typically used in connection with this process (for example, the materials for the extraction vessel or propane tank) and much of the process conditions (e.g., temperature and pressure in the extraction vessel and distillation unit) are all well known. Unless otherwise noted below, typical materials and reaction parameters can be used in each process step. These materials and process parameters can be optimized in any known manner, except where indicated below.

In order to increase the extraction yield, it is preferable to use the extraction material in a comminuted, pelleted form. If the starting material (especially when solid) has a high water content, then it is helpful to reduce the moisture content before extracting to under fifty percent by suitable drying methods.

Figure 1:
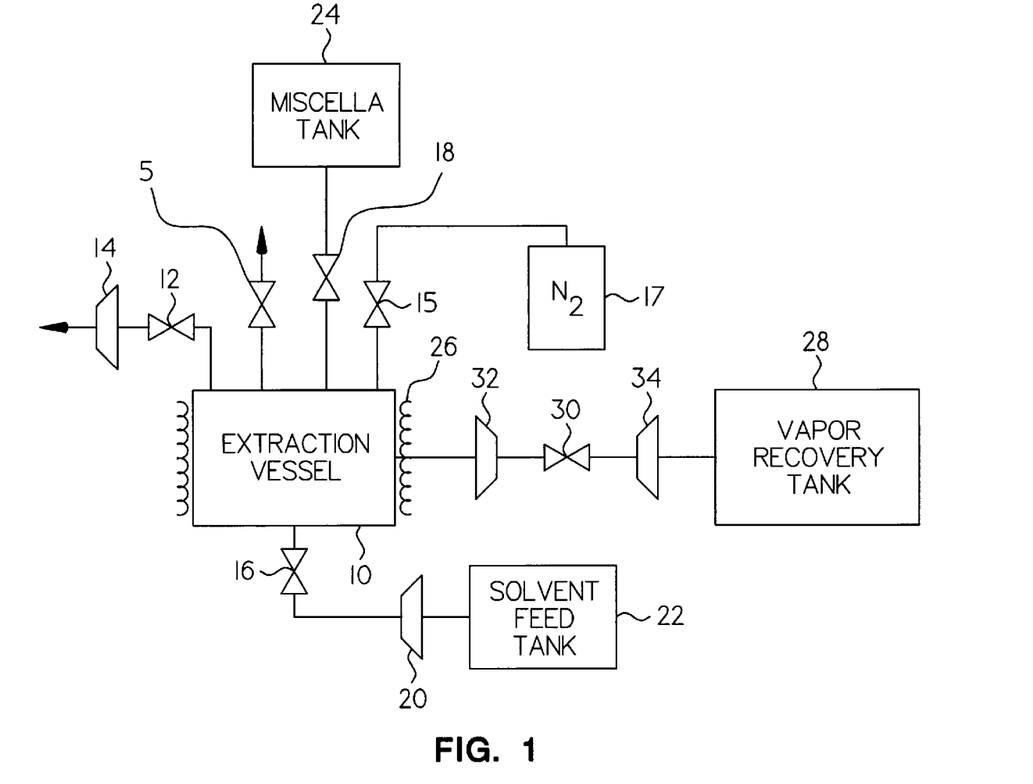
FIG. 1 is a schematic diagram of a system for use with a first embodiment of the present invention.

Referring now to the drawing wherein the same reference numerals refer to the same element, FIG. 1 shows the apparatus used in connection with the process according to the first embodiment of the present invention. According to this process, a first quantity of food solids having an oil content (typically present as fat within the food solids at atmospheric conditions) is loaded into an extraction vessel 10. As mentioned above, it is desirable to crush the solids and pelletize the fines to a particular range of pellet sizes for even extraction and to avoid the entrainment of any fines with the miscella during extraction. This can be done by crushing the solids and allowing the solids to pass through a top, coarse screen and retaining them by a finer screen, with the fines being passed to a pelletizing mill. It has been found that in the removal of cocoa butter from cocoa powder, a top screen of three and one-half mesh and a bottom screen of eight mesh is desirable.

The food solids can be charged to extraction vessel 10 by a number of methods. For example, a cyclone may be placed over an open hatch of extraction vessel 10 and conveyed until a level probe indicates that a sufficient quantity of food solids have been added. Alternatively, a hose may be placed over the open hatch from an overhead bin from load cells and a valve/slide gate may be opened. Yet another alternative for charging involves placing a hose over the open hatch from a bucket elevator fed from bulk bags or a bin fed by a belt conveyor from the food solids preparation area. Typically, the solids are loaded into a cage or a screen within the extraction vessel 10 so that the solids do not block the flow of solvent to and from extraction vessel 10 and so that none of the pellets are carried away by the solvent. After the loading process, the extraction vessel is sealed and closed off to the atmosphere.

The next step is to draw a vacuum on extraction vessel 10 to remove substantially all oxygen in extraction vessel 10. This can be done simply by opening a valve 12 disposed in a conduit attached to extraction vessel 10 near the top of the vessel and turning on a vacuum pump 14 which simply vents to atmosphere. For example, vacuum pump 14 might be a Beach-Russ vacuum pump, commercially available from the Beach-Russ Company, Brooklyn, N.Y. The primary reason for forming a vacuum is so that a combustible environment is avoided when an organic solvent is subsequently introduced to the extraction vessel. A vacuum of 1 to 2 mm Hg absolute can be obtained. Preferably, a nitrogen purge is applied to extraction vessel 10 by opening valve 15, with vacuum pump 14 still on, to introduce nitrogen gas from nitrogen tank 17 to purge the extraction vessel of any oxygen.

Next, a portion or substantially all of the oil is extracted from the food solids by passing a liquid organic solvent through extraction vessel 10 during a first extraction phase. This can be done by opening inlet valve 16 and outlet valve 18, actuating pump 20, to introduce liquid organic solvent from organic solvent feed tank 22 to extraction vessel 10 and then ultimately to miscella tank 24. As used herein, the term "miscella" shall mean a mixture of liquid organic solvent and oil which was extracted from the food solids, of any oil concentration above zero. Because of the vacuum initially in extraction vessel 10, the liquid organic solvent will typically flash initially until the pressure has risen above the vapor pressure of the particular solvent used. Thereafter, the liquid solvent begins to fill up the extraction vessel 10 and contacts the foods solids. The extracting medium may either be substantially pure liquid organic solvent (e.g., propane) or may be a miscella with a varying oil concentration, as long as the oil concentration is always below that needed to provide some extraction, based on the solubility of the oil and the concentration of oil in the food solids being extracted. The temperature and pressure during the extraction are retained at values which maintain the organic solvent as a liquid. For example, using propane to extract cocoa butter from cocoa, the temperature may range from 50° F. to 100° F. and the pressure may range from 90 psia to 300 psia.

Once the desired level of extraction has been accomplished, the temperature of the propane is increased to the maximum allowed by the pressure limitations for a brief time (e.g., a few minutes) to heat the pellets before removing substantially all of the liquid organic solvent from extraction vessel 10 and vaporizing that which remains in the pellets. This can be done by applying heat through steam jacket 26 while keeping valve 18 closed and valve 16 open. As extraction vessel 10 is heated by steam jacket 26, the temperature and pressure of the remaining liquid organic solvent increase. Thus, the liquid is forced out of the bottom of extraction vessel and returns to solvent feed tank 22. Alternatively, another conduit leading to another tank (not shown) could be used to store this liquid organic solvent. When the flow of liquid ends, this step is complete. Additional ways to remove the liquid associated with the pellets are discussed in connection with other embodiments below.

A vapor recovery tank 28 initially has a pressure less than the pressure of extraction vessel 10, after extraction vessel 10 has undergone the step of vaporizing the remaining portion of the liquid solvent. It is desirable to draw a strong vacuum on the vapor recovery tank, such as about 29 inches Hg. This can be done by pulling a vacuum on vapor recovery tank, similar to that done by vacuum pump 14 with respect to extraction vessel 10.

After the vacuum on vapor recovery tank 28 is drawn, fluid communication is established between vapor recovery tank 28 and extraction vessel 10 for a time sufficient for the pressure of vapor recovery tank 28 and the pressure of extraction vessel 10 to reach equilibrium (or approximate equilibrium). In this way, a portion of the organic solvent vapor is allowed to be introduced from the extraction vessel 10 to vapor recovery tank 28. The fluid communication between the two components can be done in any number of ways. The term "fluid communication" simply means that the interior of extraction vessel 10 is connected and permitted to flow to the interior of vapor recovery tank 28. This may occur, for example, by opening a valve 30 disposed in a conduit extending between extraction vessel 10 and vapor recovery tank 28. In this way, a portion of the organic solvent vapor is introduced from extraction vessel 10 to vapor recovery tank 28. Equilibrium is typically reached in a matter of seconds.

Next, fluid communication between extraction vessel 10 and vapor recovery tank 28 is curtailed, for example by closing valve 30. While valve 30 is closed, vacuum is released by opening valve 5 to atmosphere, then the food solids (now the oil-depleted or defatted food solids) are removed from extraction vessel 10 and another quantity of oil-bearing food solids is charged to extraction vessel 10 in a manner as discussed above in connection with the initial charging of the extraction vessel.

The pressure of extraction vessel 10 is then reduced to a pressure less than the pressure of vapor recovery tank 28 at this time in the process, namely after the portion of organic solvent vapor was introduced to vapor recovery tank 28. This can be done, for example, by actuating vacuum pump 14 and opening valve 12, as discussed in connection with the step of drawing a vacuum on extraction vessel 10 to remove substantially all oxygen in the extraction vessel. Again, the step of reducing the pressure followed by a nitrogen flush serves the purpose of removing substantially all oxygen so that the chance of a combustion is minimized and to allow for flow of organic solid vapor to be in the direction from vapor recovery tank 28 to extraction vessel 10. Once fluid communication between vapor recovery tank 28 and extraction vessel 10 is re-established, a percentage of the portion of organic solvent vapor returns from vapor recovery tank 28 to extraction vessel 10 for a second extraction phase subsequent to the first extraction phase. As used herein, the "extraction phase" means the process steps from the time that a particular quantity of food solids is placed in extraction vessel 10 until the time when that particular quantity is removed from extraction vessel 10, after the oil of that quantity has been extracted.

According to a preferred embodiment of the invention, the pressure between extraction vessel 10 and vapor recovery tank 28 is not merely allowed to reach equilibrium, but at least one vacuum pump is used to increase the percentage of vapor which is exchanged between these two tanks. For example, a first vacuum pump 32 is disposed in the conduit extending between extraction vessel 10 and vapor recovery tank 28 and has a feed end proximate to extraction vessel 10 and a discharge end proximate to vapor recovery tank 28. In the process described above, while valve 30 is open to allow a portion of the solvent vapor to be introduced from extraction vessel 10 to vapor recovery tank 28, first vacuum pump 32 is actuated to provide a higher pressure in vapor recovery tank 28 than that of extraction vessel 10. In this way, a relatively higher portion of organic solvent vapor is introduced to vapor recovery tank 28.

Similarly, a second vacuum pump 34 may be disposed in the same conduit with a feed end proximate to vapor recovery tank 28 and a discharge end proximate to extraction vessel 10. In this case, while valve 30 is open to allow a percentage of the portion of the organic solvent vapor to return from vapor recovery tank 28 to extraction vessel 10, second vacuum pump 34 is actuated to provide a relatively higher pressure in the extraction vessel than that of vapor recovery tank 28. Thus, a greater percentage of the organic solvent vapor can be recycled back to extraction vessel 10. In this embodiment, it is important to select a vacuum pump which, when turned off, can permit a flow of vapor against its normal flow path. Such pumps suitable for this function include Nash, commercially available from the Nash Engineering Co. of Trumbull, CT. Pumping action might continue until the pressure differential between the two tanks is about 27 inches Hg.

Figure 2:
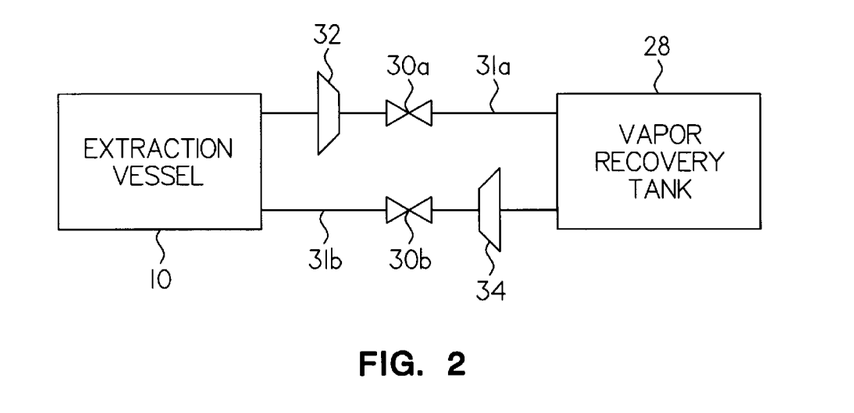
FIG. 2 is a schematic diagram of a system for use with a second embodiment of the present invention.

The process according to the embodiment shown in FIG. 2 is similar except for the connection between extraction vessel 10 and vapor recovery tank 28. According to this embodiment, a first conduit 31a and a second conduit 31b extend between extraction vessel 10 and vapor recovery tank 28. A first valve 30*a* and a first vacuum pump 32, having a discharge end leading to vapor recovery tank 28 and a feed end drawing from extraction vessel 10, are disposed in first conduit 31*a*. Similarly, second valve 30*b* and second vacuum pump 34, having a feed end drawing from vapor recovery tank 28 and a discharge end leading to extraction vessel 10, are disclosed in second conduit 31*b*.

According to this embodiment, after substantially all of the liquid organic solvent has been withdrawn from extraction vessel 10 and the remaining portion has been vaporized, first valve 30*a* is opened and first vacuum pump 32 is actuated to provide a higher pressure in vapor recovery tank 28, similar to that described above. Similarly, after the defatted food solids are removed from the extraction vessel and the food solids are charged and the extraction vessel pressure is reduced, second valve 30*b* is opened and second vacuum pump 34 is actuated to return most of the organic solvent vapor from vapor recovery tank 28 to extraction vessel 10.

Figure 3:
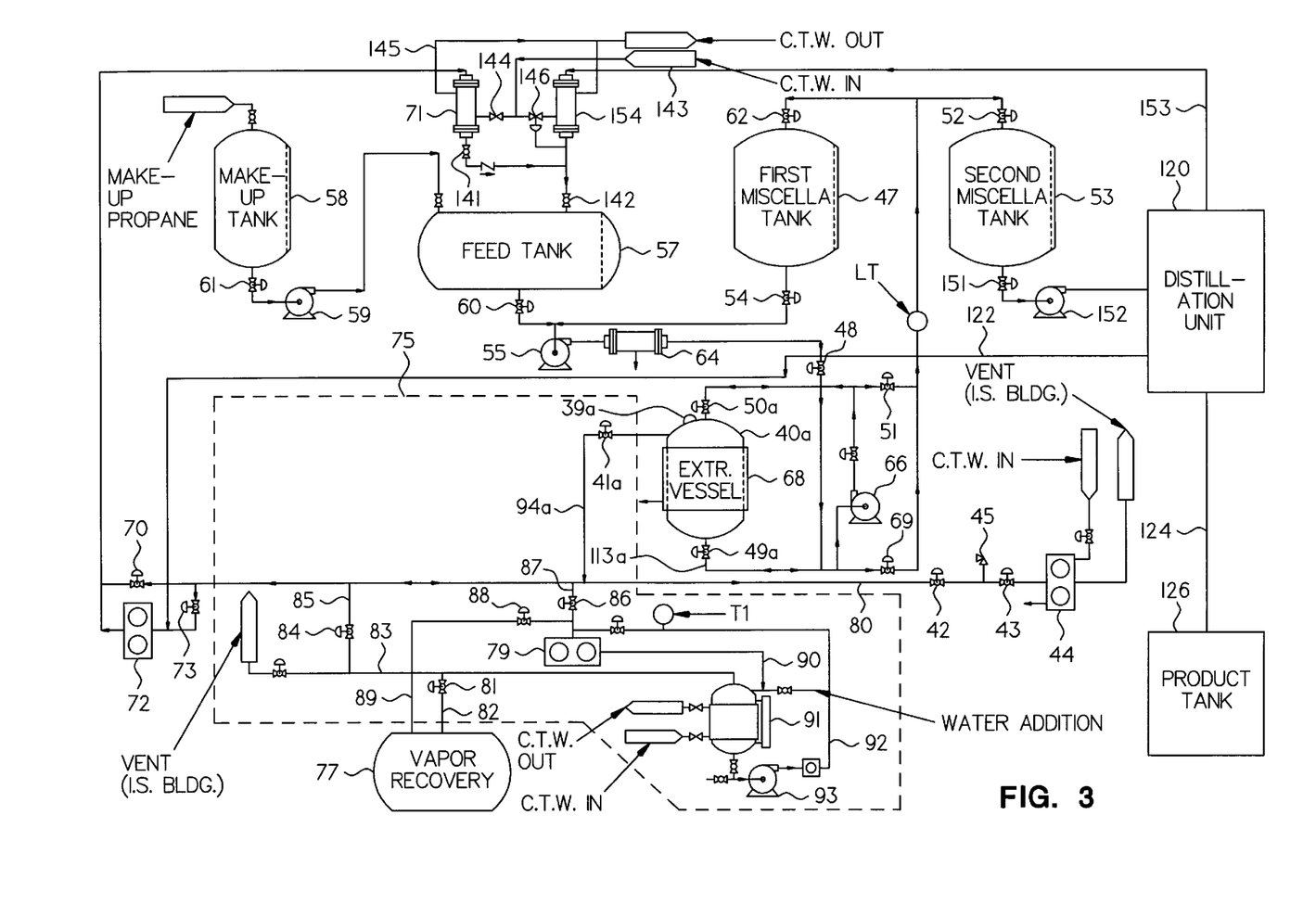
FIG. 3 is a schematic diagram of a system for use with a third embodiment of the present invention.

FIG. 3 shows another embodiment of the invention using multiple miscella tanks of variable oil concentration and, optionally, more than one extraction vessel. First, the embodiment of FIG. 3 in which only one extraction vessel is used will be discussed. In this embodiment, a first quantity of food solids is charged to extraction vessel 40*a* in the same manner as described above in connection with FIG. 1, for example through port 39*a*. Next, a vacuum is drawn on an extraction vessel 40*a* by utilizing pump 44 and opening valves 41*a*, 42, and 43. Preferably, vacuum pump 44 is a Beach-Russ vacuum pump suitable for decreasing the pressure within extraction vessel 40*a* to about 1 to 2 mm Hg. Such a pump, however, cannot withstand a pressure higher than a predetermined value. Valve 45 is a pressure relief valve which is set at a pressure to automatically open to protect pump 44 from possible damage. During the "high" pressure portion of the extraction cycle, valves 42 and 43 remain closed. These valves are then opened during the "low" pressure or vacuum producing steps of the cycle. In the event that a process failure causes these valves to open prematurely, valve 45 will relieve the overpressurization. Valve 43 is a duplication of valve 42 in order to provide additional protection for pump 44.

Then, according to this embodiment, a first portion of the oil within the oil-bearing foods solids is extracted by passing a first miscella having a medium concentration of oil in a liquid organic solvent from first miscella tank 47. First miscella could be derived from a previous extraction phase. In the event that more than three tanks are used to store miscella or pure liquid organic solvent, first miscella is taken from the tank having the second highest concentration of oil. First miscella is delivered to extraction vessel 40*a* by opening valves 54, 48, 49*a*, 50*a*, and 51 to permit a flow of forced miscella up through the inlet valve 49, from the bottom of extraction vessel 40*a*, and out outlet valve 50*a*. In addition, valve 52, the inlet valve for second miscella tank 53, is opened.

To begin the extraction, valve 54 is opened and pump 55 is actuated. A flow meter (not shown) can be installed to count the total flow and the flow rate.

When the desired total flow is reached, mid-level concentration extraction is complete. Upon completion of the mid-level concentration extraction, the extraction process is then continued by extracting a second portion of the oil from the food solids by passing substantially pure liquid organic solvent through the food solids. The substantially pure liquid organic solvent has a concentration of oil which is substantially zero and, of course, less than the concentration of oil in the first miscella. The substantially pure liquid organic solvent is passed from a feed tank 57 which can be fed with make-up liquid organic solvent from make-up tank 58, using a pump 59 and a valve 61, as needed. A propane source can be coupled to make-up tank 58, as shown.

In order to continue the extraction, valve 54 is closed and valve 60 is opened. Similarly, valve 52 is closed while valve 62 is opened. Again, pump 55 then serves to pump the substantially pure liquid organic solvent through valves 60, 48, and 49*a*, up through extraction vessel 40*a*, and then out valves 50*a* and 51 to first miscella tank 47. The miscella delivered to first miscella tank 47 has a concentration of oil which is substantially similar to the concentration of oil in the first miscella from the previous extraction phase. In a known way, the system can be automated such that if the rate of flow slows below an acceptable level, then an alarm would sound. In addition, if the temperature of the propane exceeds or is below certain levels or if the level in first miscella tank 47 exceeds a particular level, alarms would sound.

During the extraction process using either substantially pure propane or the first miscella, the solvent is passed through a heater 64 which is heated by a steam source (not shown). The propane is heated to about 90° F. to about 120° F. Also, the pump speed of pump 55 can be controlled with a frequency drive to maintain a steady flow rate until a maximum pressure drop is attained. Also, during extracting, another pump 66 can be used to push either the second miscella or third miscella out of extraction vessel 40*a* so that most of the second miscella or third miscella is removed from the extraction vessel and delivered either to second miscella tank 53 or first miscella tank 47, respectively.

Eventually, all of the liquid organic solvent is then withdrawn from the extraction vessel 40*a*. This is accomplished by closing off all but the bottom valve on extractor 40*a* (i.e., valve 49*a*), then opening steam to jacket 68. The heating increases the pressure within extraction vessel 40*a*, thus pushing the third miscella into first miscella tank 47 through valves 69 and 62. A timer starts and a liquid flow meter counts flow (in both rate and total flow). When the flow ends, drainage of liquid is substantially complete.

Even though the drainage of liquid is substantially complete, there is still a certain amount of liquid which remains within and on the defatted food solids. This liquid is vaporized by continuing to apply heat to steam jacket 68 and therefore extraction vessel 40*a*. This heat causes the liquid to vaporize during which time the pressure remains relatively constant. During this time, all valves around extraction vessel 40*a* are closed except for valve 41*a*. Valve 70 is also opened which permits the vaporized organic solvent to be conducted to compressor condenser 71 which leads to feed tank 57. When the pressure in extraction vessel drops below a certain point such that there is insufficient pressure to continue condensing, it is necessary to divert the vapor to compressor 72 by closing valve 70 and opening valve 73. The pressure range at which this re-routing of the flow of organic vapor is approximately between 125 psi and 150 psi at about 80° F.

Compressor 72 pressurizes the organic solvent vapor to such an extent that compressor condenser 71 can continue to condense the vapor. Typically, a compressor used in the position of compressor 72 is not designed to pull a vacuum on an extraction vessel. Accordingly, once the pressure within extraction vessel 40*a* is about 14.7 psi, this process step is complete. Thus, compressor 72 and condenser 71 serve to first withdraw a first fraction of organic solvent vapor by conveying it directly to condenser 71 then withdrawing a second fraction of organic solvent vapor from extraction vessel 40a by first compressing it using compressor 72 then delivering the compressed organic solvent vapor to condenser 71. In both cases, the organic solvent vapor is condensed in condenser 71 and recycled to feed tank 57 as liquid organic solvent through valves 141 and 142. Cooling tower water 143 is used as the cooling medium for condenser 71, entering through valve 144 and exiting via line 145.

A valve and conduit system 75 extends between extraction vessel 40a and a vapor recovery tank 77. Disposed within the valve and conduit system is a vacuum pump 79 having a feed end and a discharge end. The valve and conduit system, which will be discussed more detail below, provides for three configurations: (a) a first configuration providing fluid communication between extraction vessel 40a and vapor recovery tank 77, in which the feed end of vacuum pump 79 is proximate to extraction vessel 40a and the discharge end of vacuum pump 79 is proximate to vapor recovery tank 77; (b) a second configuration providing fluid communication between extraction vessel 40a and vapor recovery tank 77, in which the feed end of vacuum pump 79 is proximate to vapor recovery tank 77 and the discharge end of vacuum pump 79 is proximate to extraction vessel 40a; and (c) a third configuration precluding fluid communication between extraction vessel 40a and vapor recovery tank 77.

After the compressing/condensing step, a significant portion of the organic vapor remaining in extraction vessel 40a has been removed. Nonetheless, it is still desirable to recover the remaining organic vapor. In order to do so, valve and conduit system 75 is configured in the first configuration and the vacuum pump is actuated to allow a portion of the organic solvent vapor to be introduced from extraction vessel 40a to vapor recovery tank 77, thereby providing a higher pressure in vapor recovery tank than in the extraction vessel 40a.

When the desired pressure is reached in extraction vessel 40a, the vacuum pump is turned off and valve and conduit system 75 is configured in the third configuration which serves to isolate extraction vessel 40a from vapor recovery tank 77. At this point, the first quantity of food solids can be removed from extraction vessel 40a, which can be charged with a second quantity of food solids. A vacuum is then drawn on the extraction vessel to remove substantially all oxygen in the extraction vessel, as discussed above. Then, valve and conduit system 75 is configured in the second configuration and vacuum pump 79 is actuated to allow a portion of the organic solid vapor to be introduced from vapor recovery tank 77 to extraction vessel 40a and to provide a higher pressure in the extraction vessel than in the vapor recovery tank. Then, a portion of the oil is extracted from the second quantity of food solids during a second extraction phase, by repeating the extraction steps discussed above.

As shown in FIG. 3, valve and conduit system 75 includes valve 41a which is disposed in a first conduit 94a extending from near the top of extraction vessel 40a to a second conduit 80. Valve and conduit system 75 also includes a second valve 81 disposed in a third conduit 82 extending between vapor recovery tank 77 and a fourth conduit 83, which is in fluid communication with the discharge of vacuum pump 79. A third valve 84 is disposed in a fifth conduit 85 which extends between second conduit 80 and fourth conduit 83. A fourth valve 86 is disposed in a sixth conduit 87 which extends between second conduit 80 and the inlet of vacuum pump 79. Finally, the valve and conduit system includes a fifth valve 88 which is disposed in a seventh conduit 89 extending between vapor recovery tank 77 and the inlet of vacuum pump 79.

Thus, the step of configuring the valve and conduit system 75 in the first configuration includes closing third valve 84 and fifth valve 88 while opening first valve 41a, second valve 81, and fourth valve 86. In this way, organic solvent vapor would flow, upon actuation of vacuum pump 79, through open valve 41a, in conduit 94a, through open fourth valve 86, to the inlet of vacuum pump 79, and ultimately to conduit 83 then conduit 82 and through open second valve 81 to vapor recovery tank 77. Similarly, the step of configuring valve and conduit system 75 in the second configuration includes closing second valve 81 and fourth valve 86, while opening first valve 41a, third valve 84, and fifth valve 88. In this way, organic solvent vapor flows from vapor recovery tank 77 through conduit 89 and open fifth valve 88, through vacuum pump 79 and ultimately to conduit 83 then conduit 85 and through open third valve 84 to second conduit 80 then first conduit 94a and through open valve 41a to extraction vessel 40a.

In an embodiment of the present invention, prior to actuating vacuum pump 79 to provide a higher pressure in vapor recovery tank 77 than extraction vessel 40a, the valve and conduit system 75 may be configured in a fourth configuration in which first valve 41a, second valve 81, and third valve 84 are open while fourth valve 86 and fifth valve 88 are closed. This allows organic solvent vapor to flow, without the assistance of any pump, out conduit 94a through valve 41a, to second conduit 80, then to conduit 85 through open third valve 84, then to conduit 83, and ultimately through conduit 82 and open valve 81 to vapor recovery tank 77. The valve and conduit system 75 may be retained in this position for a time sufficient to allow the pressure of vapor recovery tank 77 and pressure of extraction vessel 41a to reach equilibrium. Similarly, prior to actuating the vacuum pump to provide a higher pressure in extraction vessel 40a than in vapor recovery tank 77, the valve and conduit system can be configured in the same fourth configuration for a time sufficient for the pressure of the vapor recovery tank 77 and that of the extraction vessel 40a to reach equilibrium.

According to a preferred embodiment of the invention, vacuum pump 79 may be a liquid ring vacuum pump (e.g., a Nash vacuum pump) in which water and vapor are fed and discharged from the pump. Such a pump is commercially available from the Nash Engineering Company. In this configuration, valve and conduit system 75 also includes an eighth conduit 90 extending from the discharge of the vacuum pump 79 to a separation unit 91. Fourth conduit 83 extends from the vapor phase of this separation unit. A ninth conduit 92 extending from the water phase of separation unit 91 provides water, driven by pump 93, to the inlet of liquid ring vacuum pump 79.

Figure 4:
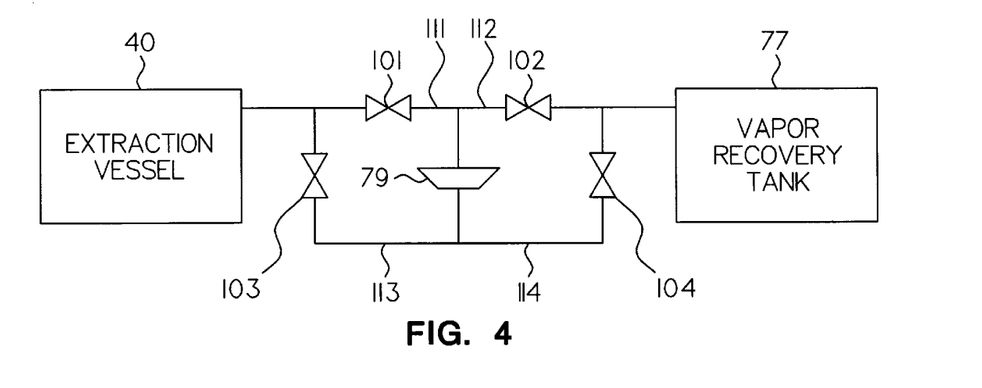
FIG. 4 is a schematic diagram of a system for use with a fourth embodiment of the present invention.

FIG. 4 of the present invention shows a different embodiment of valve and conduit system 75 extending between extraction vessel 40 and vapor recovery tank 77. In this embodiment, a first valve 101 is disposed in a first conduit 111 extending between near the top of extraction vessel 40 and the inlet of vacuum pump 79. A second valve 102 is disposed in a second conduit 112 extending between vapor recovery tank 77 and the inlet of vacuum pump 79. A third valve 103 disposed in a third conduit 113 extending between near the top of extraction vessel 40 and the discharge of vacuum pump 79. Finally, the system includes a fourth valve 104 disposed in a fourth conduit 114 extending between vapor recovery tank 77 and the discharge of vacuum pump 79.

According to this embodiment shown in FIG. 4, the step of configuring valve and conduit system 75 in the first configuration includes closing second valve 102 and third valve 103 and opening first valve 101 and fourth valve 104 such that organic solvent vapor flows from extraction vessel 40, through conduit 111 and open valve 101, through vacuum pump 79, then through conduit 114 and open valve 104 to vapor recovery tank 77. The step of configuring the valve and conduit system 75 in the second configuration includes closing first valve 101 and fourth valve 104 and opening second valve 102 and third valve 103. In this configuration, organic solvent vapor flows from vapor recovery tank 77, through conduit 112 and open valve 102, through vacuum pump 79, and through conduit 113 and open valve 103 to extraction vessel 40. The third configuration can be attained by closing all four valves 101–104.

Figure 5:
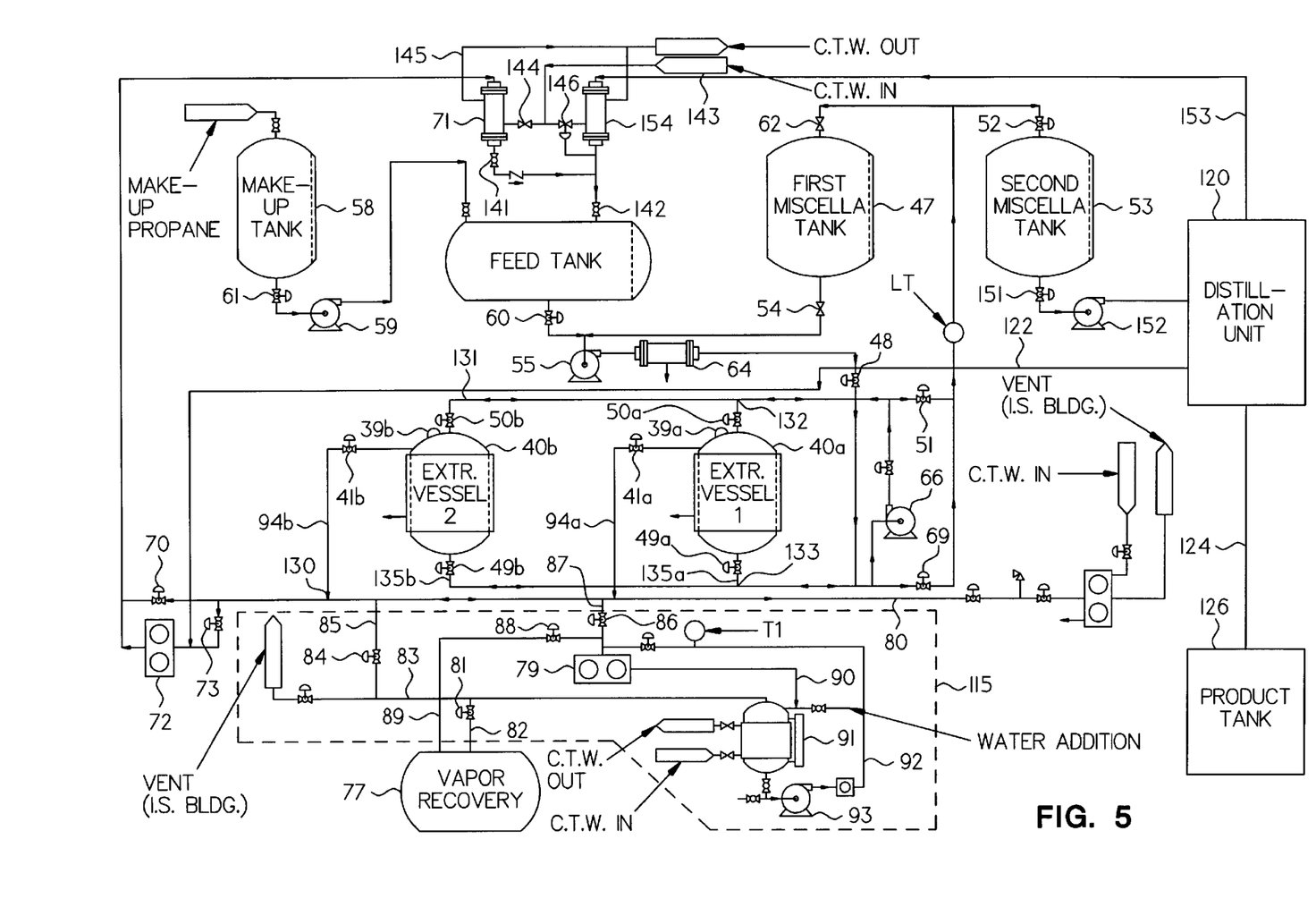
FIG. 5 is a schematic diagram of a system for use with a fifth embodiment of the present invention.

FIG. 5 shows another embodiment of the invention using multiple extraction vessel 40a and 40b. Second extraction vessel 40b can be used in the system during times when first extraction vessel 40a is being recharged with fresh food solids. The configuration of extraction vessel 40b is shown in FIG. 5 and is disposed in parallel with first extraction vessel 40a. For example, second extraction vessel 40b includes an extraction vessel conduit system having a first extraction vessel vapor valve 41b disposed in a conduit 94b leading to an extraction vessel vapor junction 130. The system also includes a second extraction liquid valve 50b disposed in a second conduit 131 extending from near the top of second extraction vessel 40b to another extraction vessel liquid junction 132. Finally, the system also includes an extraction vessel liquid junction 133 connecting a third conduit 135a extending from near the bottom of first extraction vessel 40a and a fourth conduit 135b extending from near the bottom of second extraction vessel 40b.

In this embodiment, valve and conduit system 115, analogous to valve and conduit system 75 shown in FIG. 3, excludes vessel vapor valves 41a and 41b as well as first conduits 94a and 94b. Valve and conduit system 115 can provide for first, second, and third configurations extending between extraction vessel vapor junction 130 and vapor recovery tank 77 in the same manner as valve and conduit system 75, referred to in connection with FIG. 3.

Accordingly, in the embodiment shown in FIG. 5, after extracting the oil from the food solids in extraction vessel 40a, withdrawing all of the liquid and vaporizing any remaining liquid solvent, and after loading fresh food solids in extraction vessel 40b, valve and conduit system 115 can be configured in the first configuration, with first extraction vessel vapor valve 41a open while second extraction vessel vapor valve 41b is closed. In this configuration, upon actuation of vacuum pump 79, organic solvent vapor is introduced from first extraction vessel 40a, through conduit 94a, to extraction vessel vapor junction 130 and then to vapor recovery tank 77, as described above in connection with valve and conduit system 75. Then, first extraction vessel vapor valve 41a may be closed while second extraction vessel vapor valve 41b is opened and valve and conduit system 115 is configured in the second configuration while vacuum pump 79 is actuated. In this way, organic solvent vapor stored in vapor recovery tank 77 from first extraction vessel is then delivered to second extraction vessel 40b. Then, while the extraction phase continues in extraction vessel 40b as discussed previously, the defatted food solids from extraction vessel 40a can be removed and replaced with fresh food solids.

As shown in FIGS. 3 and 5, distillation unit 120 serves to separate the oil from the liquid organic solvent from second miscella tank 53. This can be done during any of the extraction steps of this invention and up to continuously. The separation process is done by conveying the second miscella to distillation unit 120 by opening valve 151 and actuating pump 152. Distillation unit 120 might include a separator, from which extends substantially pure organic solvent vapor which can be delivered via line 153 to a distillation condenser 154, disposed in parallel with compressor condenser 71 and utilizing cooling tower water 143. Distillation unit 120 might also include a stripper from which substantially pure organic solvent vapor, at a relatively lower pressure, may be delivered via line 122 to compressor 72 and ultimately to feed tank 57. The oil product is stored in product tank 126 via conduit 124.

Although illustrated and described herein with reference to certain specific embodiments and examples, the present invention is nevertheless not intended to be limited to the details shown. Rather, various modifications may be made in the details within the scope and range of equivalents of the claims and without departing from the spirit of the invention.

What is claimed:

1. A process for removing oil from food solids comprising the steps of:

charging an extraction vessel with a first quantity of food solids having an oil content;

drawing a vacuum on said extraction vessel to remove substantially all oxygen in said extraction vessel;

extracting a portion of said oil from said first quantity by passing a liquid organic solvent through said extraction vessel during a first extraction phase;

withdrawing substantially all of said liquid organic solvent from said extraction vessel and vaporizing the remaining portion of said liquid organic solvent to form organic solvent vapor in said extraction vessel;

providing a vapor recovery tank initially having a pressure less than the pressure of said extraction vessel after the step of vaporizing the remaining portion of said liquid organic solvent;

establishing fluid communication between said vapor recovery tank and said extraction vessel for a time sufficient for the pressure of said vapor recovery tank and the pressure of said extraction vessel to reach equilibrium, thereby allowing a portion of said organic solvent vapor to be introduced from said extraction vessel to said vapor recovery tank;

curtailing said fluid communication;

removing said first quantity of said food solids from said extraction vessel and charging said extraction vessel with a second quantity of food solids;

reducing the pressure of said extraction vessel to a pressure less than the pressure of said vapor recovery tank after said portion of said organic solvent vapor is introduced to said vapor recovery tank; and re-establishing said fluid communication for a time sufficient for the pressure of said vapor recovery tank and the pressure of said extraction vessel to reach equilibrium, to allow a percentage of said portion of said organic solvent vapor to return from said vapor recovery tank to said extraction vessel for a second extraction phase subsequent to said first extraction phase.

2. A process in accordance with claim 1, wherein:

the steps of establishing and reestablishing said fluid communication comprise opening a valve located in a conduit extending between said vapor recovery tank and said extraction vessel for a time sufficient for the pressure of said vapor recovery tank and the pressure of said extraction vessel to reach equilibrium, thereby allowing a portion of said organic solvent vapor to be introduced from said extraction vessel to said vapor recovery tank; and the step of curtailing said fluid communication comprises closing said valve.

3. A process in accordance with claim 2 further comprising the steps of:

providing a first vacuum pump in said conduit with a feed end proximate to said extraction vessel and a discharge end proximate to said vapor recovery tank; and while said valve is opened to allow a portion of said organic solvent vapor to be introduced from said extraction vessel to said vapor recovery tank, actuating said first vacuum pump to provide a higher pressure in said vapor recovery tank than said extraction vessel.

4. A process in accordance with claim 3 further comprising the steps of:

providing a second vacuum pump in said conduit with a feed end proximate to said vapor recovery tank and a discharge end proximate to said extraction vessel; and while said valve is opened to allow a percentage of said portion of said organic solvent vapor to return from said vapor recovery tank to said extraction vessel, actuating said second vacuum pump to provide a higher pressure in said extraction vessel than said vapor recovery tank.

5. A process for removing oil from food solids comprising the steps of:

charging an extraction vessel with a first quantity of food solids having an oil content;

drawing a vacuum on said extraction vessel to remove substantially all oxygen in said extraction vessel;

extracting a portion of said oil from said first quantity by passing a liquid organic solvent through said extraction vessel during a first extraction phase;

withdrawing substantially all of said liquid organic solvent from said extraction vessel and vaporizing the remaining portion of said liquid organic solvent to form organic solvent vapor in said extraction vessel;

providing a vapor recovery tank having a pressure initially less than the pressure of said extraction vessel after the step of vaporizing the remaining portion of said liquid organic solvent;

providing a first valve located in a first conduit extending between said vapor recovery tank and said extraction vessel;

providing a first vacuum pump in said first conduit with a feed end proximate to said extraction vessel and a discharge end proximate to said vapor recovery tank;

opening said first valve and actuating said first vacuum pump to provide a higher pressure in said vapor recovery tank than said extraction vessel, thereby allowing a portion of said organic solvent vapor to be introduced from said extraction vessel to said vapor recovery tank;

closing said first valve;

removing said first quantity of said food solids from said extraction vessel and charging said extraction vessel with a second quantity of food solids;

reducing the pressure of said extraction vessel to a pressure less than the pressure of said vapor recovery tank after said portion of said organic solvent vapor is introduced to said vapor recovery tank;

providing a second valve disposed in a second conduit extending in parallel with said first conduit between said extraction vessel and said vapor recovery tank;

providing a second vacuum pump in said second conduit with a feed end proximate to said vapor recovery tank and a discharge end proximate to said extraction vessel; and opening said second valve and actuating said second vacuum pump to provide a higher pressure in said extraction vessel than said vapor recovery tank and to allow a percentage of said portion of said organic solvent vapor to return from said vapor recovery tank to said extraction vessel for a second extraction phase subsequent to said first extraction phase.

6. A process for removing oil from food solids comprising the steps of:

charging an extraction vessel with a first quantity of food solids having an oil content;

drawing a vacuum on said extraction vessel to remove substantially all oxygen in said extraction vessel;

extracting a first portion of said oil from said first quantity by passing a first miscella, having a first concentration of oil in a liquid organic solvent, from a first miscella tank through said extraction vessel to form a second miscella, having a second concentration of oil greater than said first concentration, during a first extraction phase and delivering said second miscella to a second miscella tank;

extracting a second portion of said oil from said first quantity by passing substantially pure liquid organic solvent, having a third concentration of oil substantially zero and less than the first concentration, from a feed tank through said extraction vessel to form a third miscella, having a third concentration of oil substantially similar to the second concentration, during said first extraction phase and delivering said third miscella to said first miscella tank;

withdrawing substantially all of said liquid organic solvent from said extraction vessel and vaporizing the remaining portion of said liquid organic solvent to form organic solvent vapor in said extraction vessel;

providing a vapor recovery tank initially having a pressure less than the pressure of said extraction vessel after the step of vaporizing the remaining portion of said liquid organic solvent;

providing a valve and conduit system extending between said extraction vessel and said vapor recovery tank and providing a vacuum pump, disposed in said valve and conduit system and having a feed end and a discharge end, wherein said valve and conduit system provides for:

(a) a first configuration providing fluid communication between said extraction vessel and said vapor recovery tank and in which the feed end of said vacuum pump is proximate to said extraction vessel and the discharge end of said vacuum pump is proximate to said vapor recovery tank;

(b) a second configuration providing fluid communication between said extraction vessel and said vapor recovery tank and in which the feed end of said vacuum pump is proximate to said vapor recovery tank and the discharge end of said vacuum pump is proximate to said extraction vessel; and (c) a third configuration precluding fluid communication between said extraction vessel and said vapor recovery tank;

configuring said valve and conduit system in said first configuration and actuating said vacuum pump to allow a portion of said organic solvent vapor to be introduced from said extraction vessel to said vapor recovery tank and to provide a higher pressure in said vapor recovery tank than said extraction vessel;

configuring said valve and conduit system in said third configuration;

removing said first quantity of said food solids from said extraction vessel and charging said extraction vessel with a second quantity of food solids;

drawing a vacuum on said extraction vessel to remove substantially all oxygen in said extraction vessel;

configuring said valve and conduit system in said second configuration and actuating said vacuum pump to allow a portion of said organic solvent vapor to be introduced from said vapor recovery tank to said extraction vessel and to provide a higher pressure in said extraction vessel than said vapor recovery tank;

configuring said valve and conduit system in said third configuration and extracting a portion of said oil from said second quantity during a second extraction phase by repeating the extraction steps.

7. A process in accordance with claim 6, wherein:

said valve and conduit system comprises:
(a) a first valve disposed in a first conduit extending from near the top of said extraction vessel to a second conduit;
(b) a second valve disposed in a third conduit extending between said vapor recovery tank and a fourth conduit which is in fluid communication with the discharge of said vacuum pump;
(c) a third valve disposed in a fifth conduit extending between said second conduit and said fourth conduit;
(d) a fourth valve disposed in a sixth conduit extending between said second conduit and the inlet of said vacuum pump; and
(e) a fifth valve disposed in a seventh conduit extending between said vapor recovery tank and the inlet of said vacuum pump;

the step of configuring said valve and conduit system in said first configuration comprises closing said third valve and said fifth valve and opening said first valve, said second valve, and said fourth valve; and the step of configuring said valve and conduit system in said second configuration comprises closing said second valve and said fourth valve and opening said first valve, said third valve, and said fifth valve.

8. A process in accordance with claim 7 further comprising:

prior to actuating said vacuum pump to provide a higher pressure in said vapor recovery tank than said extraction vessel, configuring said valve and conduit system in a fourth configuration in which said first valve, said second valve and said third valve are opened and said fourth valve and said fifth valve are closed, for a time sufficient for the pressure of said vapor recovery tank and the pressure of said extraction vessel to reach equilibrium; and prior to actuating said vacuum pump to provide a higher pressure in said extraction vessel than said vapor recovery tank, configuring said valve and conduit system in said fourth configuration for a time sufficient for the pressure of said vapor recovery tank and the pressure of said extraction vessel to reach equilibrium.

9. A process in accordance with claim 7, wherein:

said vacuum pump is a liquid ring vacuum pump in which water and vapor are fed and discharged from said pump; and said valve and conduit system further comprises:
(a) an eighth conduit extending from the discharge of said liquid ring vacuum pump to a separation unit, wherein said fourth conduit extends from the vapor phase of said separation unit; and
(b) a ninth conduit extending from the water phase of the separation unit to the inlet of said liquid ring vacuum pump.

10. A process in accordance with claim 6, wherein:

said valve and conduit system comprises:
(a) a first valve disposed in a first conduit extending between near the top of said extraction vessel and the inlet of said vacuum pump;
(b) a second valve disposed in a second conduit extending between said vapor recovery tank and the inlet of said vacuum pump;
(c) a third valve disposed in a third conduit extending between near the top of said extraction vessel and the discharge of said vacuum pump; and
(d) a fourth valve disposed in a fourth conduit extending between said vapor recovery tank and the discharge of said vacuum pump;

the step of configuring said valve and conduit system in said first configuration comprises closing said second valve and said third valve and opening said first valve and said fourth valve; and the step of configuring said valve and conduit system in said second configuration comprises closing said first valve and said fourth valve and opening said second valve and said third valve.

11. A process in accordance with claim 6, wherein:

the step of extracting said first portion includes pumping said second miscella to said second miscella tank to remove substantially all of said second miscella from said extraction vessel; and the step of extracting said second portion includes pumping said third miscella to said third miscella tank to remove substantially all of said third miscella from said extraction vessel.

12. A process in accordance with claim 6, wherein the step of providing said vapor recovery tank comprises drawing a vacuum within said vapor recovery tank.

13. A process in accordance with claim 6, wherein the step of withdrawing substantially all of said liquid organic solvent from said extraction vessel comprises heating said extraction vessel while maintaining open a first valve disposed in a first conduit extending between near the bottom of said extraction vessel and said first miscella tank.

14. A process in accordance with claim 13, wherein the step of vaporizing the remaining portion of said liquid organic solvent to form organic solvent vapor in said extraction vessel comprises continuing to heat said extraction vessel.

15. A process in accordance with claim 14 further comprising, prior to actuating said vacuum pump to allow a portion of said organic solvent vapor to be introduced from said extraction vessel to said vapor recovery tank and to provide a higher pressure in said vapor recovery tank than said extraction vessel:

withdrawing a first fraction of said organic solvent vapor by conveying said vapor to a condenser; and withdrawing a second fraction of said organic solvent vapor by first compressing said organic solvent vapor then delivering said compressed organic solvent vapor to said condenser.

16. A process in accordance with claim 6 further comprising, after the step of drawing a vacuum on said extraction vessel to remove substantially all oxygen in said extraction vessel, the step of purging said extraction vessel with nitrogen.

17. A process for recovering oil from food solids comprising the steps of:

charging a first extraction vessel with a first quantity of food solids having an oil content;

drawing a vacuum on said first extraction vessel to remove substantially all oxygen in said first extraction vessel;

extracting a first portion of said oil from said first quantity by passing a first miscella, having a first concentration of oil in a liquid organic solvent, from a first miscella tank through said first extraction vessel to form a second miscella, having a second concentration of oil greater than said first concentration, during a first extraction phase and delivering said second miscella to a second miscella tank;

extracting a second portion of said oil from said first quantity by passing substantially pure liquid organic solvent, having a third concentration of oil substantially zero and less than the first concentration, from a feed tank through said first extraction vessel to form a third miscella, having a fourth concentration of oil substantially similar to the second concentration, during said first extraction phase and delivering said third miscella to said first miscella tank;

withdrawing substantially all of said liquid organic solvent from said first extraction vessel and vaporizing the remaining portion of said liquid organic solvent to form organic solvent vapor in said first extraction vessel;

providing a vapor recovery tank initially having a pressure less than the pressure of said first extraction vessel after the step of vaporizing the remaining portion of said liquid organic solvent;

providing a second extraction vessel in parallel with said first extraction vessel and an extraction vessel conduit system which includes: (a) a first extraction vessel vapor valve disposed in a first conduit extending from near the top of said first extraction vessel to an extraction vessel vapor junction; (b) a second extraction vessel vapor valve disposed in a second conduit extending from near the top of said second extraction vessel to said extraction vessel vapor junction; and (c) an extraction vessel liquid junction connecting a third conduit extending from near the bottom of said first extraction vessel and a fourth conduit extending from near the bottom of said second extraction vessel;

charging said second extraction vessel with a second quantity of food solids having an oil content;

drawing a vacuum on said second extraction vessel to remove substantially all oxygen in said second extraction vessel;

providing a valve and conduit system extending between said extraction vessel vapor junction and said vapor recovery tank and providing a vacuum pump, disposed in said valve and conduit system and having a feed end and a discharge end, wherein said valve and conduit system provides for:

(a) a first configuration providing fluid communication between said extraction vessel vapor junction and said vapor recovery tank and in which the feed end of said vacuum pump is proximate to said extraction vessel vapor junction and the discharge end of said vacuum pump is proximate to said vapor recovery tank;

(d) a second configuration providing fluid communication between said extraction vessel vapor junction and said vapor recovery tank and in which the feed end of said vacuum pump is proximate to said vapor recovery tank and the discharge end of said vacuum pump is proximate to said extraction vessel vapor junction; and (e) a third configuration precluding fluid communication between said extraction vessel vapor junction and said vapor recovery tank;

opening said first extraction vessel vapor valve, closing said second extraction vessel vapor valve, configuring said valve and conduit system in said first configuration and actuating said vacuum pump to allow a portion of said organic solvent vapor to be introduced from first said extraction vessel to said vapor recovery tank and to provide a higher pressure in said vapor recovery tank than first said extraction vessel;

closing said first extraction vessel vapor valve, opening said second extraction vessel vapor valve, and configuring said valve and conduit system in said second configuration and actuating said vacuum pump to allow a portion of said organic solvent vapor to be introduced from said vapor recovery tank to said second extraction vessel and to provide a higher pressure in said second extraction vessel than said vapor recovery tank;

extracting a portion of said oil from said second quantity in said second extraction vessel by repeating the extraction steps; and during any of the above steps and up to continuously, conveying said second miscella to a distillation unit at which said second miscella is separated into said substantially pure liquid organic solvent and oil product and returning said substantially pure liquid organic solvent to said feed tank.

* * * * *